United States Patent
Kojima et al.

(10) Patent No.: US 10,107,354 B2
(45) Date of Patent: Oct. 23, 2018

(54) LIQUID-FILLED BUSHING

(71) Applicant: BRIDGESTONE CORPORATION, Tokyo (JP)

(72) Inventors: Hiroshi Kojima, Tokyo (JP); Toru Ebara, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/513,070

(22) PCT Filed: Aug. 6, 2015

(86) PCT No.: PCT/JP2015/072349
§ 371 (c)(1),
(2) Date: Mar. 21, 2017

(87) PCT Pub. No.: WO2016/051956
PCT Pub. Date: Apr. 7, 2016

(65) Prior Publication Data
US 2017/0299011 A1 Oct. 19, 2017

(30) Foreign Application Priority Data

Oct. 3, 2014 (JP) ................................. 2014-205039

(51) Int. Cl.
*F16F 13/16* (2006.01)
*F16F 1/38* (2006.01)

(52) U.S. Cl.
CPC ............ *F16F 13/16* (2013.01); *F16F 1/3842* (2013.01); *F16F 2230/06* (2013.01)

(58) Field of Classification Search
CPC ....... F16F 13/16; F16F 1/3842; F16F 2230/06
See application file for complete search history.

(56) References Cited

U.S. PATENT DOCUMENTS

| 5,013,012 A | 5/1991 | Jouade |
| 2002/0014729 A1* | 2/2002 | Umemura ............ F16F 1/3842 |
| | | 267/140.11 |

(Continued)

FOREIGN PATENT DOCUMENTS

| CN | 102884338 A | 1/2013 |
| EP | 0248714 A1 | 12/1987 |

(Continued)

OTHER PUBLICATIONS

International Search Report of PCT/JP2015/072349, dated Sep. 8, 2015. [PCT/ISA/210].

(Continued)

*Primary Examiner* — Vishal R Sahni
(74) *Attorney, Agent, or Firm* — Sughrue Mion, PLLC

(57) ABSTRACT

A liquid-filled bushing (1) includes an inner tube (11) and an outer member (12). The outer member (12) defines a pair of liquid chambers between the outer member (12) and the inner tube (11), and an orifice portion (13) in which an orifice passage (24) which communicates with the liquid chambers is formed. An elastic body (14) which elastically connects together the orifice portion (13) and the inner tube (11) is provided. The pair of liquid chambers are individually disposed on both sides between which the inner tube (11) is interposed. A first protrusion portion (11a) which protrudes outward in the radial direction and is fitted into the elastic body is formed in the inner tube (11), and a second protrusion portion (28) which protrudes inward in the radial direction and is fitted into the elastic body (14) is formed in the orifice portion (13). The first protrusion portion (11a) and the second protrusion portion (28) are disposed in both portions between the pair of liquid chambers adjacent in a circumferential direction such that positions of the portions in the circumferential direction coincide with each other and (Continued)

positions of the portions in the direction of the center axis are different from each other.

8 Claims, 3 Drawing Sheets

(56) References Cited

U.S. PATENT DOCUMENTS

| 2004/0056397 | A1* | 3/2004 | Tatura | F16F 1/387 267/140.12 |
| 2013/0038006 | A1 | 2/2013 | Saito et al. | |
| 2013/0069288 | A1* | 3/2013 | Saito | F16F 13/16 267/140.13 |

FOREIGN PATENT DOCUMENTS

| EP | 0332901 | A2 | 9/1989 |
| GB | 2395765 | A | 6/2004 |
| JP | 0642577 | A | 2/1994 |
| JP | 7-158688 | A | 6/1995 |
| JP | 7-269641 | A | 10/1995 |
| JP | 11-030267 | A | 2/1999 |
| JP | 2002266929 | A | 9/2002 |
| JP | 2005-155822 | A | 6/2005 |
| WO | WO2004092613 | * | 10/2004 |
| WO | 2006/027827 | A1 | 3/2006 |

OTHER PUBLICATIONS

Communication dated Oct. 23, 2017, from the European Patent Office in counterpart European Application No. 15848087.1.

Communication dated Aug. 1, 2018, from the State Intellectual Property Office of People's Republic of China in counterpart Application No. 201580053152.0.

* cited by examiner

LIQUID-FILLED BUSHING

CROSS REFERENCE TO RELATED APPLICATIONS

This application is a National Stage of International Application No. PCT/JP2015/072349 filed Aug. 6, 2015, claiming priority based on Japanese Patent Application No. 2014-205039, filed Oct. 3, 2014, the contents of all of which are incorporated herein by reference in their entirety.

TECHNICAL FIELD

The present invention relates to a liquid-filled bushing.
Priority is claimed on Japanese Patent Application No. 2014-205039, filed on Oct. 3, 2014, the content of which is incorporated herein by reference.

BACKGROUND ART

In the related art, for example, as described in Patent Document 1 below, a liquid-filled bushing is known, which includes an inner tubular body which is connected to one of a vibration generation source and a vibration receiving portion, and an outer tubular body which is disposed so as to surround the inner tubular body and is connected to the other of the vibration generation source and the vibration receiving portion. In addition, a configuration is known, which includes an elastic body which is interposed between the outer tubular body and the inner tubular body and connects together the outer tubular body and the inner tubular body, a pair of liquid chambers which is defined at both positions in a vibration input direction in the inner tubular body is inserted into the elastic body and in which liquid is sealed, and an orifice through which the pair of liquid chambers communicates with each other.

CITATION LIST

Patent Document

[Patent Document 1] Japanese Unexamined Patent Application, First Publication No. 117-269641

SUMMARY OF INVENTION

Technical Problem

Meanwhile, in the liquid-filled bushing of the related art, in a case where the liquid-filled bushing is used for an automobile, for example, the inner tubular body is connected to one of a suspension bushing and an engine mount, and the outer tubular body is connected to the other.

However, in the liquid-filled bushing of the related art, in the case where the liquid-filled bushing is used for an automobile as described above, there is room for improvement in high performance such as riding comfortability or steering stability.

The present invention is made in consideration of the above-described circumstances, and for example, an object thereof is to provide a liquid-filled bushing in which high performance such as improvements in riding comfortability or steering stability is achieved by increasing a difference between spring constants in an input direction of a main vibration and a direction orthogonal to the input direction.

Solution to Problem

In order to achieve the object, the present invention adopts the following means.

According to the present invention, there is provided a liquid-filled bushing, including: an inner tube which is connected to any one of a vibration generation portion and a vibration receiving portion; and an outer member which is disposed outside the inner tube in a radial direction and is connected to the other thereof, in which the outer member defines a pair of liquid chambers between the inner tube and the outer member, and includes an orifice portion in which an orifice passage through which the pair of liquid chambers communicates with each other is formed, the bushing further includes and an elastic body which elastically connects together the orifice portion and the inner tube, the pair of liquid chambers are individually disposed on both sides between which a center axis of the inner tube is interposed in the radial direction between the inner tube and the orifice portion, a first protrusion portion which protrudes outward in the radial direction and is fitted into the elastic body is formed in the inner tube, and a second protrusion portion which protrudes inward in the radial direction and is fitted into the elastic body is formed in the orifice portion, and the first protrusion portion and the second protrusion portion are disposed in both portions between the pair of liquid chambers adjacent in a circumferential direction such that positions of the portions in the circumferential direction coincide with each other and positions of the portions in the direction of the center axis are different from each other.

Advantageous Effects of Invention

According to the liquid-filled bushing of the present invention, it is possible to achieve high performance with respect to riding comfortability, steering stability, or the like by increasing a spring ratio between an input direction of a main vibration and a direction orthogonal to the input direction.

DESCRIPTION OF EMBODIMENTS

Figure 1:
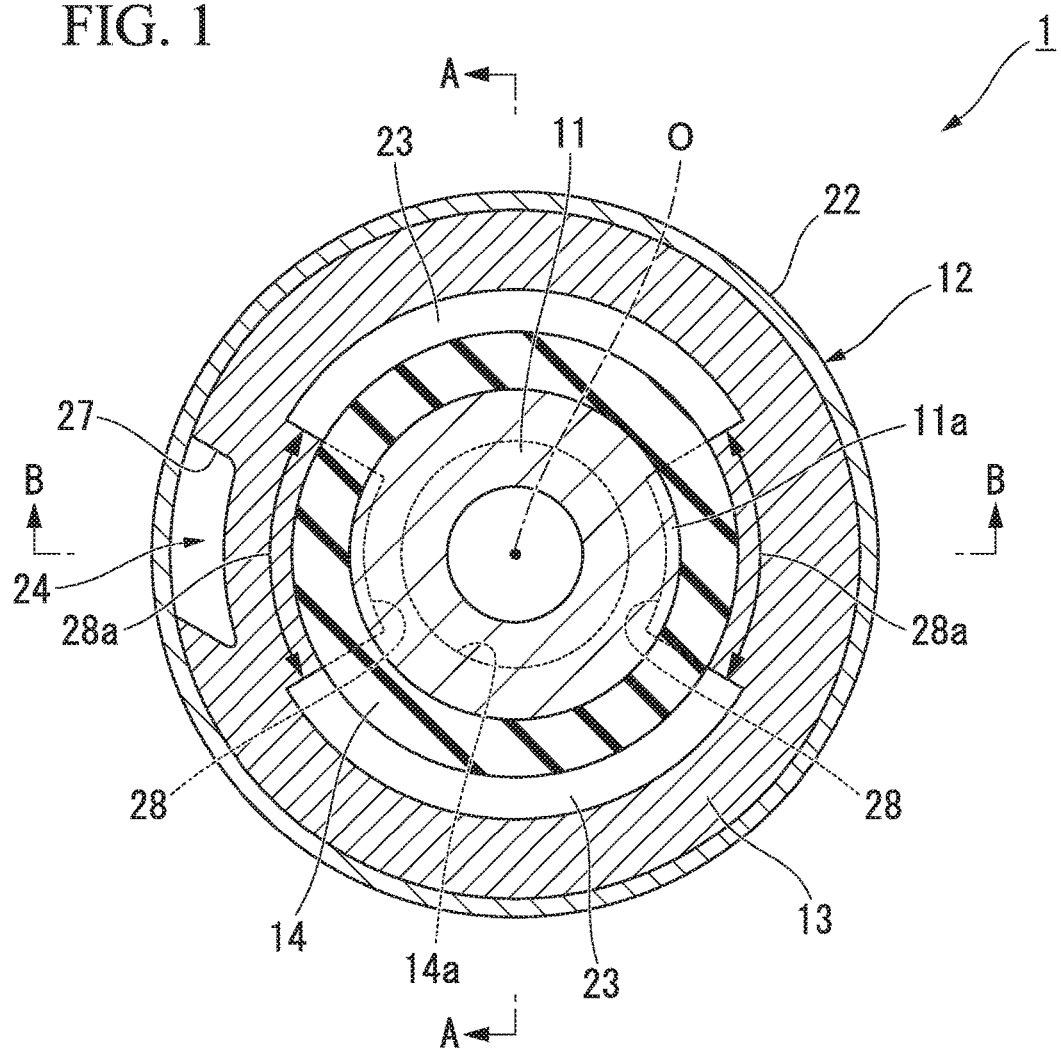
FIG. 1 is a cross sectional view in a center portion in an axial direction of a liquid-filled bushing which is an embodiment according to the present invention.
Figure 2:
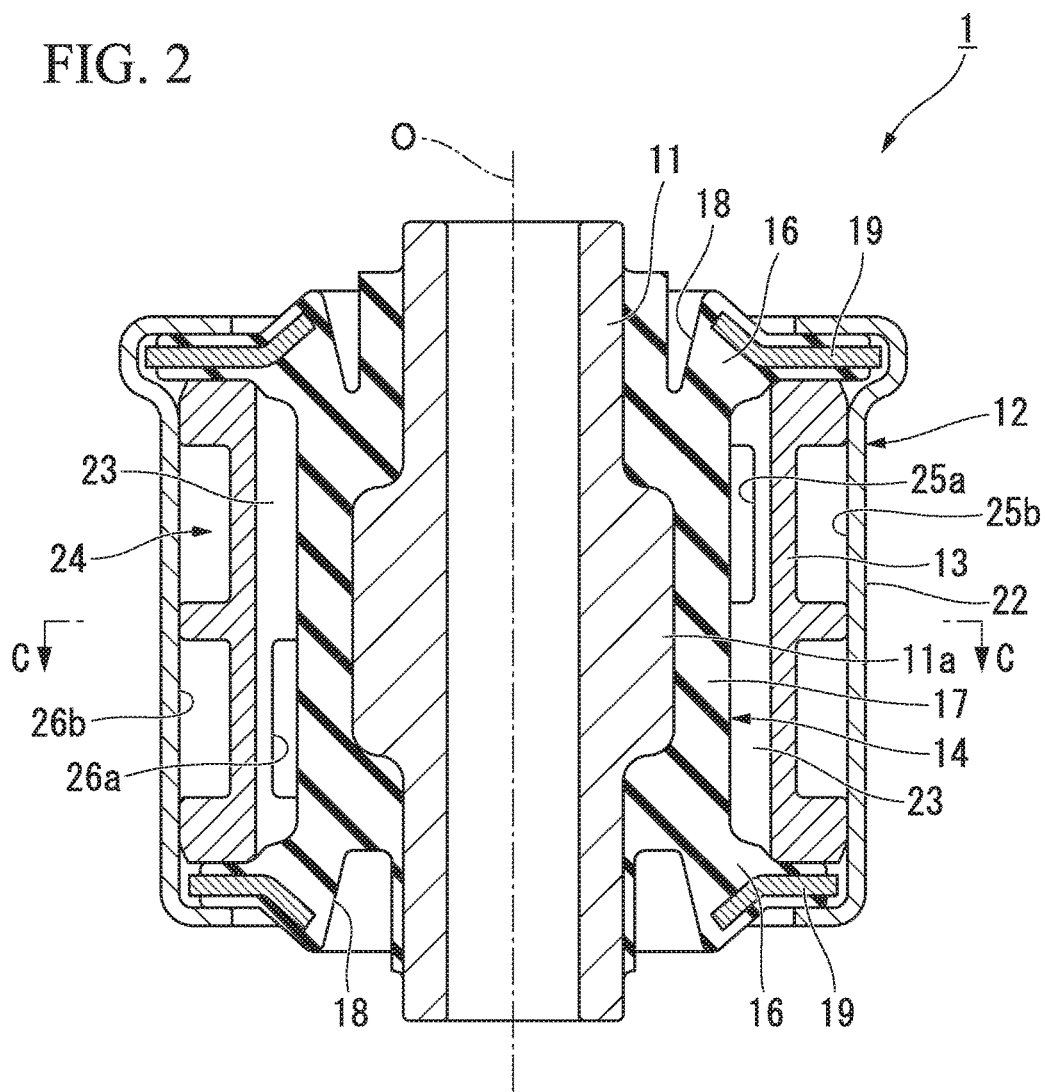
FIG. 2 is a longitudinal sectional view taken along line A-A of the liquid-filled bushing shown in FIG. 1.
Figure 3:
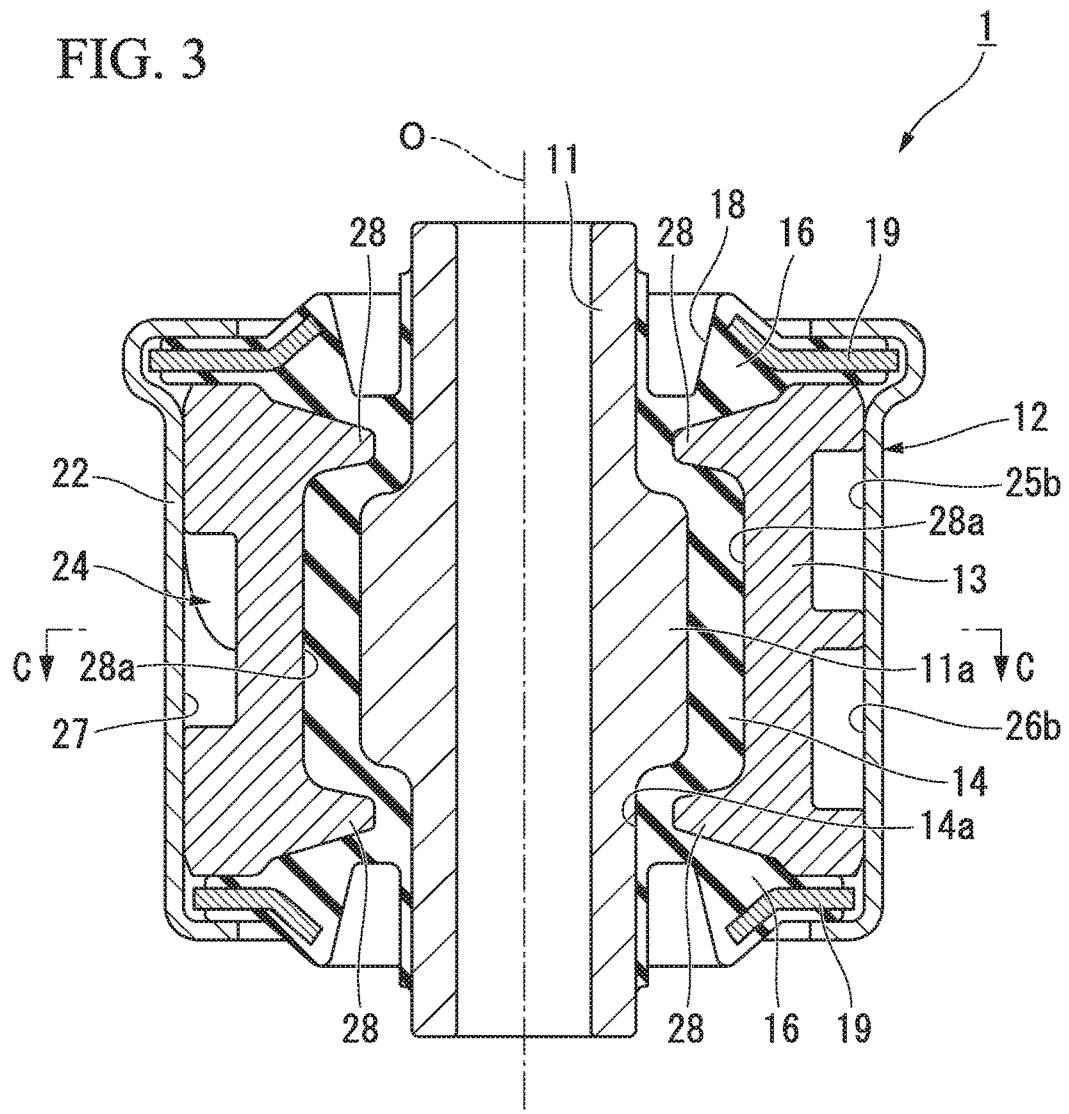
FIG. 3 is a longitudinal sectional view taken along line B-B of the liquid-filled bushing shown in FIG. 1.

Hereinafter, an embodiment of a liquid-filled bushing according to the present invention will be described with reference to FIGS. 1 to 3. In addition, FIG. 1 is a cross sectional view in a center portion in an axial direction of the liquid-filled bushing which is the embodiment according to the present invention. FIG. 2 is a longitudinal sectional view taken along line A-A in FIG. 1, and FIG. 3 is a longitudinal sectional view taken along line B-B in FIG. 1. Moreover, FIG. 1 is a cross sectional view taken along line C-C in FIGS. 2 and 3.

A liquid-filled bushing 1 of the present embodiment shown in FIGS. 1 to 3 includes an inner tube 11 which is connected to one of a vibration generation portion and a vibration receiving portion, a tubular outer member 12 which is disposed outside the inner tube 11 in a radial direction and is connected to the other, and an elastic body 14 which elastically connects together an orifice portion 13 included in the outer member 12 and the inner tube 11.

In addition, for example, the liquid-filled bushing 1 is used for a suspension bushing or an engine mount for an automobile, a mount of an industrial machine installed in a factory, or the like.

The inner tube 11 and the outer member 12 are disposed to be coaxial with a common axis. Hereinafter, the common axis is referred to as an axis O. In addition, in a plan view when viewed in the direction of the axis O, a direction orthogonal to the axis O is referred to as a radial direction, and a direction around the axis O is referred to as a circumferential direction.

The inner tube 11 is formed in a cylindrical shape, and a first protrusion portion 11a which protrudes outward in the radial direction is provided so as to protrude over the entire circumference at an intermediate portion in the direction of the axis O. The first protrusion portion 11a is disposed to be fitted into the elastic body 14 described below, and in the present embodiment, is disposed to be sunk into the elastic body 14. In addition, an inner diameter of the inner tube 11 is constant over the entire length in the direction of the axis O.

The elastic body 14 is formed in a cylindrical shape made of a rubber material and is formed in an annular shape. In addition, the elastic body 14 includes an annular end portion 16 in which the inner circumferential surface is connected to the outer circumferential surface of the inner tube 11, and an interposing portion 17 which covers the outer circumferential surface of the inner tube 11 and connects together a pair of upper and lower annular end portions 16. In the elastic body 14, the inner circumferential surface of each of the annular end portion 16 and the interposing portion 17 is vulcanized and adhered to the outer circumferential surface of the inner tube 11 over the entire region except for both end portions in the direction of the axis O.

In addition, in the elastic body 14, annular notched grooves 18 which are opened outward in the direction of the axis O and extend in the circumferential direction are formed on both end portions in the direction of the axis O, that is, on the pair of upper and lower annular end portions 16. Since the notched grooves 18 are formed, flexibility of the elastic body 14 increases, and a spring constant of the liquid-filled bushing 1 is adjusted so as to be a value which is appropriately set.

The outer member 12 is disposed outside the inner tube 11 in the radial direction and surrounds the inner tube 11. The outer member 12 includes a pair of upper and lower annular plates 19, a tubular orifice portion 13 which is disposed between the annular plates 19 and 19, and an outer tube 22 which integrally surrounds the annular plates 19 and 19 and the orifice portion 13 from the outside in the radial direction. As shown in FIG. 1, the outer member 12 defines a pair of liquid chambers 23 and 23 between the inner tube 11 and the outer member 12.

As shown in FIG. 2, each annular plate 19 is embedded to a portion of the annular end portion 16 of the elastic body 14 which is positioned further outside in the radial direction than the notched groove 18. The elastic body 14 is vulcanized and adhered to the annular plate 19.

The orifice portion 13 is formed in a cylindrical shape which surrounds the inner tube 11 and is made of a synthetic resin or the like. In the orifice portion 13, an orifice passage 24 through which the pair of liquid chambers 23 and 23 communicates with each other is formed.

As shown in FIG. 1, the pair of liquid chambers 23 and 23 is disposed on both sides between which the axis O of the inner tube 11 is interposed in the radial direction between the inner tube 11 and the orifice portion 13, and liquid is sealed in (fills) the pair of liquid chambers 23 and 23. In the orifice portion 13, as shown in FIG. 2, a first opening 25a which opens to the inside of one liquid chamber 23, a first communication passage 25b which communicates with the first opening 25a, a second opening 26a which opens to the inside of the other liquid chamber 23, and a second communication passage 26b which communicates with the second opening 26a are formed, and as shown in FIG. 3, a combined passage 27 which combines the first communication passage 25b and the second communication passage 26b is formed. In addition, the first communication passage 25b, the second communication passage 26b, and the combined passage 27 are defined by the orifice portion 13 and the outer tube 22 such that groove portions formed on the outer circumferential surface of the orifice portion 13 are covered by the outer tube 22 of the outer member 12 from the outside in the radial direction.

The orifice passage 24 through which the pair of liquid chambers 23 and 23 communicates with each other is formed by the first opening 25a, the first communication passage 25b, the second opening 26a, the second communication passage 26b, and the combined passage 27. That is, the liquid inside one liquid chamber 23 flows through the first opening 25a, the first communication passage 25b, the combined passage 27, the second communication passage 26b, and the second opening 26a in this order, and can flow into the other liquid chamber 23. In addition, the liquid inside the other liquid chamber 23 flows in a direction opposite to the above flow, and can flow into the other liquid chamber 23.

In addition, in the orifice portion 13, as shown in FIG. 1, second protrusion portions 28 are formed in both portions between the pair of liquid chambers 23 and 23 adjacent in the circumferential direction. The second protrusion portions 28 protrude inward in the radial direction, are formed to extend in the circumferential direction, and are formed over the entire region of the orifice portion 13 except for the portion which defines the pair of liquid chambers 23 and 23. The positions of the second protrusion portions 28 coincide with the position of the first protrusion portion 11a of the inner tube 11 in the circumferential direction, that is, the second protrusion portions 28 are disposed so as to overlap the first protrusion portion 11a in the circumferential direction.

In addition, as shown in FIG. 3, the second protrusion portions 28 are disposed such that the positions of the second protrusion portions 28 are different from the position of the first protrusion portion 11a in the direction of the axis O. In the present embodiment, two second protrusion portions 28 are formed at an interval in the direction of the axis O in both portions between the pair of liquid chambers 23 and 23. In addition, the two second protrusion portions 28 positioned on the same side in the circumferential direction are disposed outside the first protrusion portion 11a in the direction of the axis O. Accordingly, the first protrusion portion 11a is disposed between the two second protrusion portions 28 and 28.

Moreover, similarly to the first protrusion portion 11a, each second protrusion portion 28 is fitted into the elastic body 14, and in the present embodiment, is disposed to be sunk into the elastic body 14. In the present embodiment, two second protrusion portions 28 which are positioned on the same side in the circumferential direction are disposed to face the first protrusion portion 11a in the direction of the axis O in a state where the elastic body 14 is interposed therebetween. That is, the first protrusion portion 11a and the second protrusion portion 28 face each other in the direction of the axis O in a state where the elastic body 14 is interposed therebetween. Accordingly, when viewed from the outside in the direction of the axis O, the first protrusion portion 11a and the second protrusion portion 28 are disposed such that the tip sides thereof are partially overlapped with each other. In addition, a reference numeral 14a indicated by a broken line in FIG. 1 shows an inner circumferential surface 14a of the elastic body 14 which face the second protrusion portion 28 in FIG. 3 and is a location into which the second protrusion portion 28 is fitted.

Here, as shown in FIG. 1, the elastic body 14 elastically connects together a portion 28a in the circumferential direction of the inner circumferential surface of the orifice portion 13 at which the second protrusion portion 28 is positioned, and the outer circumferential surface of the inner tube 11 facing the portion 28a in a solid state in which a gap therebetween does not exist. That is, as shown in FIG. 3, the elastic body 14 abuts on the portion 28a between the two second protrusion portions 28 and 28 disposed at an interval in the direction of the axis O and the outer circumferential surface of the first protrusion portion 11a of the inner tube 11 disposed between the two second protrusion portions 28 and 28, and elastically connects together the portions therebetween.

The outer tube 22 is formed in a tubular shape, is caulked and integrally fixed to the annular end portions 16 of the elastic body 14, and is integrally formed with the annular plates 19 and 19 via the annular end portions 16. Moreover, as described above, the outer tube 22 surrounds the orifice portion 13, liquid-tightly covers the outer circumferential surface of the orifice portion 13, and defines the first communication passage 25b, the second communication passage 26b, and the combined passage 27 along with the orifice portion 13. In addition, the outer tube 22 is externally fitted to the elastic body 14 via the orifice portion 13, and is elastically connected to the inner tube 11 via the elastic body 14.

In a case where the liquid-filled bushing 1 having the above-described configuration is used for an automobile, for example, if the inner tube 11 is connected to an engine mount which is a vibration generation portion, the outer member 12 is connected to a suspension bushing which is a vibration receiving portion. In addition, the inner tube 11 may be connected to the suspension bushing, and the outer member 12 may be connected to the engine mount.

Moreover, for example, a vibration in the direction of the axis O which is an input direction of a main vibration is applied to a portion between the inner tube 11 and the outer member 12, the inner tube 11 and the outer member 12 are displaced relative to each other in the direction of the axis O. In addition, since the first protrusion portion 11a is formed in the inner tube 11 and the second protrusion portions 28 are formed in the orifice portion 13, the first protrusion portion 11a and the second protrusion portions 28 elastically deform the elastic body 14 in a uniform manner. Accordingly, an elastic return force is generated by the elastic body 14, and a relatively large spring force is obtained in the direction of the axis O.

In addition, since the first protrusion portion 11a and the second protrusion portions 28 are disposed in both portions between the pair of liquid chambers 23 and 23 adjacent in the circumferential direction, the inner tube 11 and the outer member 12 are easily deformed straightly without being relatively deviated in the direction of the axis O. Accordingly, the vibration in the direction of the axis O is effectively dampened and absorbed.

Therefore, according to the liquid-filled bushing 1 of the present embodiment, the spring constant increases in the direction of the axis O along the center axis of the inner tube 11, and it is possible to increase a difference between this spring constant and a spring constant in the radial direction. Accordingly, since it is possible to increase the difference between the spring constant in the input direction of the main vibration and the spring constant in the direction orthogonal to the input direction, in a case where the liquid-filled bushing 1 of the present embodiment is used for an automobile or the like, it is possible to achieve high performance such as having both improved riding comfortability and favorable steering stability.

In addition, since the first protrusion portion 11a and the second protrusion portions 28 face each other in the direction of the axis O in a state where the elastic body 14 is interposed therebetween, when the inner tube 11 and the outer member 12 are relatively displaced to each other in the direction of the axis O, it is possible to more effectively dampen a vibration in the direction of the axis O and absorb the vibration. That is, since stress generated due to the displacement of the first protrusion portion 11a receives not only a reaction force from the elastic body 14 but also a reaction force from the second protrusion portion 28 via the elastic body 14, it is possible to more effectively dampen the vibration in the direction of the axis O. In addition, since stress generated due to the displacement of the second protrusion portions 28 receives not only the reaction force from the elastic body 14 but also the reaction force from the first protrusion portion 11a via the elastic body 14, it is possible to more effectively dampen the vibration in the direction of the axis O. Accordingly, it is possible to increase the spring constant in the direction of the axis O along the center axis of the inner tube 11.

In addition, the two second protrusion portions 28 are formed at an interval in the direction of the axis O and the first protrusion portion 11a is disposed between the two second protrusion portions 28 and 28, when the inner tube 11 and the outer member 12 are displaced relative to each other in the direction of the axis O, it is possible to more effectively dampen and absorb the vibration in the direction of the axis O. That is, for example, when the first protrusion portion 11a is relatively displaced in the direction of the axis O, even though the first protrusion portion 11a is relatively displaced toward any side in the direction of the axis O, since the first protrusion portion 11a receives the reaction force from the second protrusion portion 28, it is possible more effectively dampen the vibration in the direction of the axis O. Accordingly, it is possible to further increase the spring constant in the direction of the axis O along the center axis of the inner tube 11.

In addition, the orifice portion 13 is formed in a tubular shape so as to surround the inner tube 11, and the portion 28a in the circumferential direction of the inner circumferential surface of the orifice portion 13 at which the second protrusion portion 28 is positioned and the outer circumferential surface of the first protrusion portion 11a of the inner tube 11 facing the portion 28a are elastically connected together by the elastic body 14. Accordingly, for example, by appropriately changing a thickness of the portion of the orifice portion 13 in the circumferential direction in which the second protrusion portion 28 is positioned or a thickness of the portion of the inner tube 11 in the circumferential direction in which the first protrusion portion 11a is positioned, or the like, thicknesses of the elastic body 14 positioned at the portions are relatively changed. Accordingly, it is possible to change the spring constant in the direction orthogonal to the direction in which the pair of liquid chambers 23 and 23 face each other in the radial direction without changing the material of the elastic body 14, and it is possible to easily adjust the spring constant in the orthogonal direction. Accordingly, it is possible to increase the difference between the spring constant in the input direction of the main vibration and the spring constant in the direction orthogonal to the input direction.

Moreover, the technical scope of the present invention is not limited to the embodiment, and various modifications can be applied within a scope which does not depart from the gist of the present invention.

For example, in the embodiment, the two second protrusion portions 28 are formed in both portions between the pair of liquid chambers 23 and 23 adjacent in the circumferential direction. However, one second protrusion portion 28 may be formed in both portions between the liquid chambers 23 and 23.

In addition, in a case where one second protrusion portion 28 is formed in this way, two first protrusion portions 11a may be formed at an interval in the direction of the axis O with respect to the second protrusion portion 28.

In addition, in the embodiment, the first protrusion portion 11a is disposed to be sunk into the elastic body 14, and the second protrusion portion 28 is also formed to be sunk into the elastic body 14. Accordingly, the elastic body 14 is compressively deformed in a no-load state by the first protrusion portion 11a or the second protrusion portion 28. However, the present invention is not limited to this, and any configuration may be adopted as long as the first protrusion portion 11a or the second protrusion portion 28 is fitted into the elastic body 14. That is, a recessed portion is formed in the elastic body 14, and the first protrusion portion 11a or the second protrusion portion 28 may be fitted into the recessed portion. In this case, the recessed portion is formed to be smaller than the first protrusion portion 11a or the second protrusion portion 28, and accordingly, the elastic body 14 may be compressively deformed in a no-load state by fitting the first protrusion portion 11a or the second protrusion 40 portion 28 into the recessed portion. In addition, the recessed portion is formed to have a size which is the same as or more than the first protrusion portion 11a or the second protrusion portion 28, and accordingly, the elastic body 14 may be compressively deformed in a no-load state by fitting the first protrusion portion 11a or the second protrusion portion 28 into the recessed portion.

Moreover, in the embodiment, the first protrusion portion 11a and the second protrusion portion 28 face each other in the direction of the axis O in a state where the elastic body 14 is interposed therebetween, that is, when viewed from the outside in the direction of the axis O, the first protrusion portion 11a and the second protrusion portion 28 are disposed so as to be overlapped with each other. However, the tip sides of the portions may be not overlapped with each other and may be disposed without facing each other as long as the positions of the portions in the circumferential direction coincide with each other.

In addition, the liquid-filled bushing according to the present invention is not limited to the use in an engine mount of an automobile, and can be applied to uses different from the use in the engine mount. For example, the liquid-filled bushing can be applied to a mount of an electric generator mounted on an industrial machine, or can be applied to a mount of a machine installed in a factory or the like.

In addition, components in the embodiment can be appropriately replaced with known components within a scope which does not depart from the gist of the present invention, and the above-described modification examples may be appropriately combined.

INDUSTRIAL APPLICABILITY

According to the liquid-filled bushing of the present invention, it is possible to achieve high performance with respect to riding comfortability, steering stability, or the like by increasing the spring ratio between the input direction of the main vibration and the direction orthogonal to the input direction.

REFERENCE SIGNS LIST

1: liquid-filled bushing
11: inner tube
11a: first protrusion portion
12: outer member
13: orifice portion
14: elastic body
23: liquid chamber
24: orifice passage
28: second protrusion portions
28a: portion
O: axis

The invention claimed is:
1. A liquid-filled bushing, comprising:
an inner tube which is connected to any one of a vibration generation portion and a vibration receiving portion; and
an outer member which is disposed outside the inner tube in a radial direction and is connected to the other thereof,
wherein the outer member defines a pair of liquid chambers between the inner tube and the outer member, and includes an orifice portion in which an orifice passage through which the pair of liquid chambers communicates with each other is formed,
wherein the bushing further comprises an elastic body which elastically connects together the orifice portion and the inner tube,
wherein the pair of liquid chambers are individually disposed on both sides between which a center axis of the inner tube is interposed in the radial direction between the inner tube and the orifice portion,
wherein a first protrusion portion which protrudes outward in the radial direction and is fitted into the elastic body is formed in the inner tube, and a second protrusion portion which protrudes inward in the radial direction and is fitted into the elastic body is formed in the orifice portion,
wherein the first protrusion portion and the second protrusion portion are disposed between each of the pair of liquid chambers adjacent in a circumferential direction such that positions of the first protrusion portion and the second protrusion portion in the circumferential direction coincide with each other and positions of the first protrusion portion and the second protrusion portion in the direction of the center axis are different from each other, and
wherein the elastic body elastically connects a portion of the inner circumferential surface of the orifice portion in which the second protrusion portion is positioned, and an outer circumferential surface of the inner tube facing the portion, in a solid state, and the portion extends between both ends of the orifice in the center axis direction.

2. The liquid-filled bushing according to claim 1, wherein the first protrusion portion and the second protrusion portion face each other in the direction of the center axis in a state where the elastic body is interposed therebetween.

3. The liquid-filled bushing according to claim 1, wherein any one of the first protrusion portion and the second protrusion portion is formed in two pieces with an interval therebetween in the direction of the center axis, and the other of the first protrusion portion and the second protrusion portion is disposed between the two pieces of the formed protrusion portions.

4. The liquid-filled bushing according to claim 2, wherein any one of the first protrusion portion and the second protrusion portion is formed in two pieces with an interval therebetween in the direction of the center axis, and the other of the first protrusion portion and the second protrusion portion thereof is disposed between the two pieces of the formed protrusion portions.

5. The liquid-filled bushing according to claim 1, wherein the orifice portion is formed in a tubular shape which surrounds the inner tube, and
wherein the elastic body elastically connects together a portion in the circumferential direction of an inner circumferential surface of the orifice portion at which the second protrusion portion is positioned and an outer circumferential surface of the inner tube facing the portion.

6. The liquid-filled bushing according to claim 2, wherein the orifice portion is formed in a tubular shape which surrounds the inner tube, and
wherein the elastic body elastically connects together a portion in the circumferential direction of an inner circumferential surface of the orifice portion at which the second protrusion portion is positioned and an outer circumferential surface of the inner tube facing the portion.

7. The liquid-filled bushing according to claim 3, wherein the orifice portion is formed in a tubular shape which surrounds the inner tube, and
wherein the elastic body elastically connects together a portion in the circumferential direction of an inner circumferential surface of the orifice portion at which the second protrusion portion is positioned and an outer circumferential surface of the inner tube facing the portion.

8. The liquid-filled bushing according to claim 4, wherein the orifice portion is formed in a tubular shape which surrounds the inner tube, and
wherein the elastic body elastically connects together a portion in the circumferential direction of an inner circumferential surface of the orifice portion at which the second protrusion portion is positioned and an outer circumferential surface of the inner tube facing the portion.

* * * * *